(12) United States Patent
Shakuda

(10) Patent No.: US 7,902,770 B2
(45) Date of Patent: Mar. 8, 2011

(54) LIGHT EMITTING DEVICE

(75) Inventor: Yukio Shakuda, Kyoto (JP)

(73) Assignee: Rohm Co., Ltd. (JP)

( * ) Notice: Subject to any disclaimer, the term of this patent is extended or adjusted under 35 U.S.C. 154(b) by 468 days.

(21) Appl. No.: 12/094,091

(22) PCT Filed: Nov. 15, 2006

(86) PCT No.: PCT/JP2006/322770
§ 371 (c)(1),
(2), (4) Date: May 16, 2008

(87) PCT Pub. No.: WO2007/058215
PCT Pub. Date: May 24, 2007

(65) Prior Publication Data
US 2009/0160361 A1    Jun. 25, 2009

(30) Foreign Application Priority Data
Nov. 16, 2005    (JP) .................................. 2005-332197

(51) Int. Cl.
*H05B 37/02* (2006.01)
(52) U.S. Cl. ........................................ 315/291; 315/312
(58) Field of Classification Search ............. 315/185 R, 315/185 S, 193–195, 291, 307, 312, 315, 315/324; 362/227, 249.01, 249.05, 800
See application file for complete search history.

(56) References Cited

U.S. PATENT DOCUMENTS

| 5,936,599 A * | 8/1999 | Reymond .................... 345/82 |
| 6,285,140 B1 * | 9/2001 | Ruxton ........................ 315/312 |
| 6,411,045 B1 * | 6/2002 | Nerone ........................ 315/291 |

FOREIGN PATENT DOCUMENTS

| JP | S50-74157 | 6/1975 |
| JP | 01264276 | 10/1989 |
| JP | H0263194 | 5/1990 |
| JP | 05275970 | 10/1993 |
| JP | 07114990 | 5/1995 |
| JP | 08148721 | 6/1996 |
| JP | 11016683 | 1/1999 |
| JP | 2000259993 | 9/2000 |
| JP | 2004512697 | 4/2004 |
| WO | 03056878 | 7/2003 |

OTHER PUBLICATIONS

International Preliminary Report on Pantentability for Application No. PCT/JP2006/322770; Issuance date May 20, 2008.
International Search Report for Application No. PCT/JP2006/322770; Mailing date of report Feb. 6, 2007.

* cited by examiner

*Primary Examiner* — Jacob Y Choi
*Assistant Examiner* — Jimmy T Vu
(74) *Attorney, Agent, or Firm* — Cantor Colburn LLP

(57) ABSTRACT

A light emitting element group includes a plurality of light emitting element units connected in series. A first current limiting circuit is arranged in series with the light emitting element group, and limits a first drive current flowing from one end to the other end of the light emitting element group. A second current limiting circuit is arranged in parallel to the first current limiting circuit, and limits a second drive current flowing in an opposite direction to the first drive current in the light emitting element group. The light emitting element units are configured to include a first light emitting element and a second light emitting element; an anode of the first light emitting element and a cathode of the second light emitting element are connected, and an anode of the second light emitting element and a cathode of the first light emitting element are connected.

7 Claims, 6 Drawing Sheets

FIG.4A  Vac

FIG.4B  Idrv1

FIG.4C  Idrv2

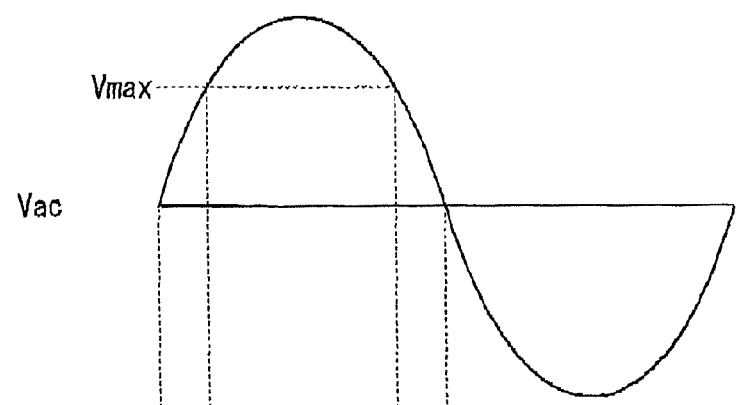
FIG.7A  Vac
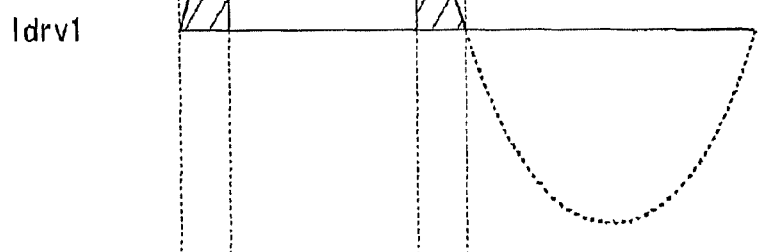
FIG.7B  Idrv1
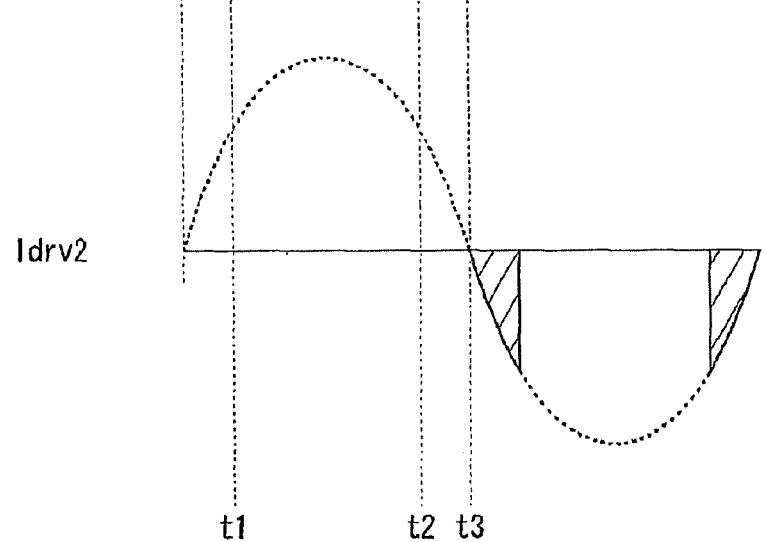
FIG.7C  Idrv2

LIGHT EMITTING DEVICE

CROSS REFERENCE TO RELATED APPLICATIONS

This is a U.S. national stage of application No. PCT/JP2006/322770, filed on 15 Nov. 2006. Priority under 35 U.S.C. §119(a) and 35 U.S.C. §365(b) is claimed from Japanese Application No. 2005-332197, filed 16 Nov. 2005, the disclosure of which is also incorporated herein by reference.

BACKGROUND OF THE INVENTION

1. Field of the Invention

The present invention relates to drive technology for light emitting elements such as a light emitting diode (referred to below as LED) or an organic EL element, and in particular to drive technology by AC voltage.

2. Description of the Related Art

In recent years, light emitting elements such as LEDs of high luminous efficiency and the like have been attracting attention as light sources instead of conventional lighting. For example, attempts are being made to use light emitting elements such as LEDs as lighting in place of fluorescent tubes, and as lighting in vehicle headlights and the like.

In this way, with the spread of LED application, in consideration, for example, of usage of LEDs as substitutes for fluorescent tubes and the like, it is desirable to be able to drive light emitting elements directly, using an AC voltage such as a 100 V commercial power supply or the like. Technology for driving an LED by an AC voltage is disclosed, for example, in Patent Documents 1 and 2.

Patent Document 1: Japanese Patent Application, Laid Open No. H8-148721
Patent Document 2: International Publication No. WO2003/056878

In cases in which a light emitting element such as an LED is driven by an AC voltage, when a large current exceeding the rating flows in the light emitting element, there is a risk of having an effect on reliability of a circuit. Furthermore, it is desirable that brightness of the light emitting element be maintained at a constant value even if amplitude of the AC voltage varies.

SUMMARY OF THE INVENTION

The present invention has been made in view of these issues and a general purpose thereof is to provide a light emitting device that can be driven by an AC voltage, in which circuit protection can be improved, or stability of brightness can be raised.

An embodiment of the present invention relates to a light emitting device that is driven by an AC voltage. The light emitting device is provided with a light emitting element group including a plurality of light emitting element units connected in series; a first current limiting circuit arranged in series with the light emitting element group, to limit a first drive current flowing from one end to the other end of the light emitting element group; and a second current limiting circuit arranged in parallel to the first current limiting circuit, to limit a second drive current flowing in the light emitting element group in a direction opposite to the first drive current. The light emitting element units are configured to include a first light emitting element and a second light emitting element, an anode of the first light emitting element being connected to a cathode of the second light emitting element, and an anode of the second light emitting element being connected to a cathode of the first light emitting element.

According to this embodiment, for every half-wave of the AC voltage, the first drive current and the second drive current flow alternately, and the first light emitting element and the second light emitting element included in the light emitting element group alternately emit light. The first drive current and the second drive current are limited respectively by the first current limiting circuit and the second current limiting circuit, so that brightness is stabilized, and also it is possible to prevent a large current exceeding rating from flowing in the light emitting elements.

The first and second current limiting circuits may be clamp circuits which respectively clamp the first drive current and the second drive current at a predetermined current value. In such cases, current flowing in the first light emitting element and the second light emitting element included in the light emitting element group has a constant value in a vicinity of an AC half-wave peak, so that brightness can be further stabilized.

The clamp circuits may include a constant current diode provided on a current path to be clamped. By using the constant current diode, it is possible to stabilize current flowing the light emitting element group to a constant value.

The first and the second current limiting circuits may be current block circuits which interrupt paths, when the first drive current and the second drive current respectively exceed a predetermined threshold current.

In such cases, when the first and the second drive currents exceed the threshold current, since a current does not flow in the light emitting element group, it is possible to further improve circuit protection.

A current block circuit that is the first current limiting circuit may include an NPN-type first bipolar transistor; a first resistor arranged between base and collector of the first bipolar transistor; a PNP-type second bipolar transistor whose emitter is connected to the base of the first bipolar transistor; an NPN-type third bipolar transistor whose collector is connected to a base of the second bipolar transistor and whose base is connected to a collector of the second bipolar transistor; a first diode whose anode is connected to an emitter of the first bipolar transistor; a second resistor, one end of which is connected to a cathode of the first diode, and the other end of which is connected to the base of the third bipolar transistor; and a third resistor, one end of which is connected to the cathode of the first diode, and the other end of which is connected to an emitter of the third bipolar transistor; and may have a collector terminal of the first bipolar transistor as an input terminal, and the emitter of the third bipolar transistor as an output terminal.

Furthermore, a current block circuit that is the second current limiting circuit may include a PNP-type fourth bipolar transistor; a fourth resistor arranged between base and collector of the fourth bipolar transistor; an NPN-type fifth bipolar transistor whose emitter is connected to the base of the fourth bipolar transistor; a PNP-type sixth bipolar transistor whose collector is connected to a base of the fifth bipolar transistor and whose base is connected to a collector of the sixth bipolar transistor; a second diode whose cathode is connected to an emitter of the fourth bipolar transistor; a fifth resistor, one end of which is connected to an anode of the second diode, and the other end of which is connected to the base of the sixth bipolar transistor; and a sixth resistor, one end of which is connected to the anode of the second diode, and the other end of which is connected to an emitter of the sixth bipolar transistor; and may have the emitter of the sixth bipolar transistor as an input terminal, and a collector terminal of the fourth bipolar transistor as an output terminal.

With the abovementioned configuration, when the first drive current or the second drive current exceed a threshold current determined by the first resistor or the fourth resistor, the breaker circuits of the first and the second current limiting circuits can preferably interrupt current flowing in the light emitting element group.

The light emitting device may be monolithically integrated on one semiconductor substrate. "Monolithically integrated" included cases in which all component elements of a circuit are formed on the semiconductor substrate, and cases in which main component elements of the circuit are integrated, and some resistors, capacitors, or the like, for adjusting a circuit constant may be arranged outside the semiconductor substrate. By integrating the light emitting device as one LSI, it is possible to reduce circuit area, and also to uniformly maintain a circuit element property.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 7A to 7C are operation waveform charts of the light emitting device according to the second embodiment.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

First Embodiment

Figure 1:
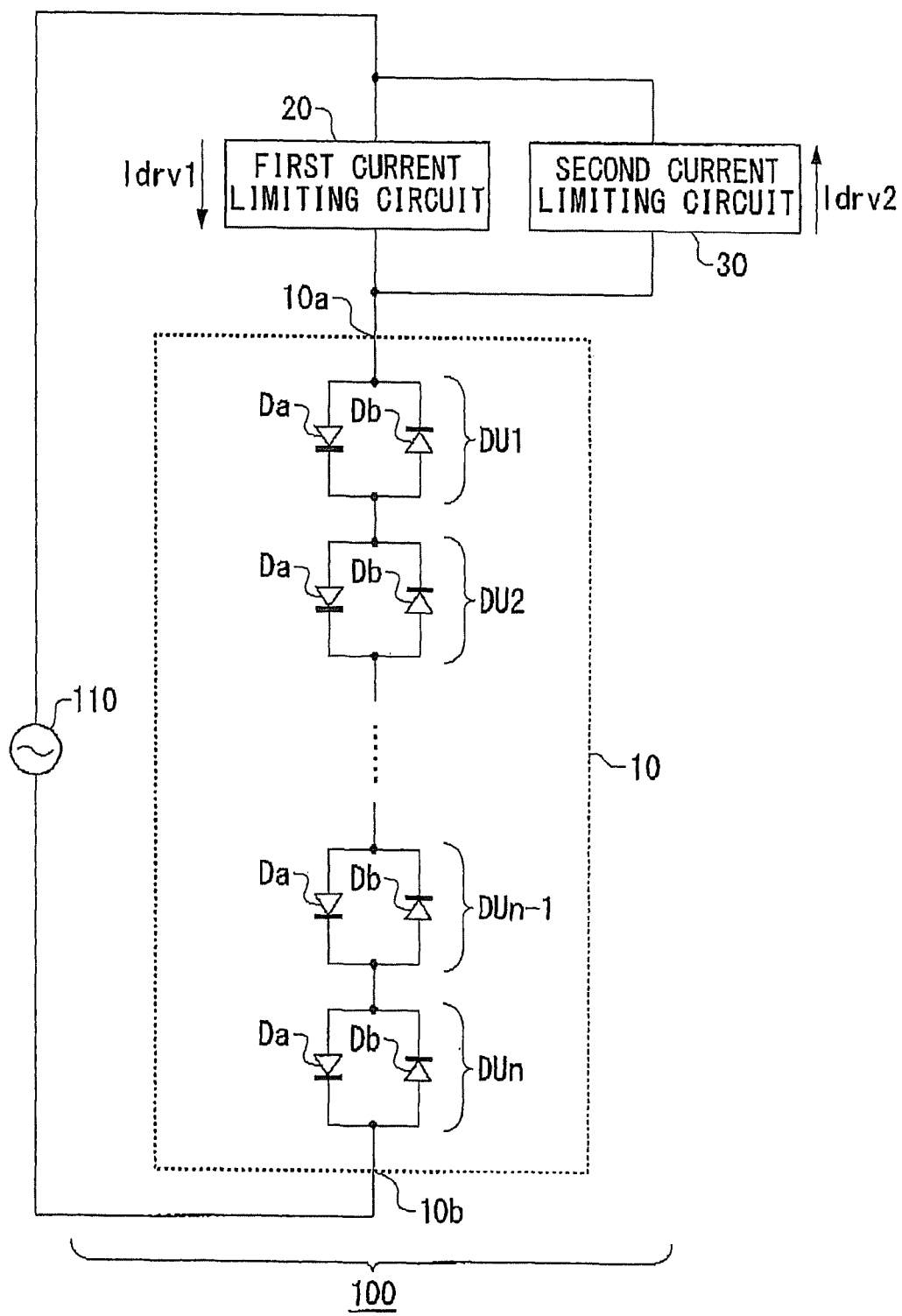
FIG. 1 is a circuit diagram showing a configuration of a light emitting device according to a first embodiment.

FIG. 1 is a circuit diagram showing a configuration of the light emitting device 100 according to a first embodiment of the present invention. The light emitting device 100 is driven by an AC voltage Vac supplied from an AC voltage supply 110. The light emitting device 100 according to the present embodiment is provided with a light emitting element group 10, a first current limiting circuit 20, and a second current limiting circuit 30. The light emitting element group 10 includes n light emitting element units DU1 to DUn (n is a natural number) connected in series. Each of the light emitting element units DU1 to DUn is configured to include a first light emitting element Da and a second light emitting element Db. In the present embodiment, the first light emitting element Da and the second light emitting element Db are light emitting diodes. An anode of the first light emitting element Da and a cathode of the second light emitting element Db are connected, and an anode of the second light emitting element Db and a cathode of the first light emitting element Da are connected.

The first current limiting circuit 20 is arranged in series on a drive path of the AC voltage supply 110 and the light emitting element group 10, and limits a first drive current Idrv1 flowing from one end 10a to the other end 10b of the light emitting element group 10. The second current limiting circuit 30 is arranged in parallel to the first current limiting circuit 20, and limits a second drive current Idrv2 flowing in an opposite direction to the first drive current Idrv1 in the light emitting element group 10, that is from the end 10b to the other end 10a.

Figure 2:
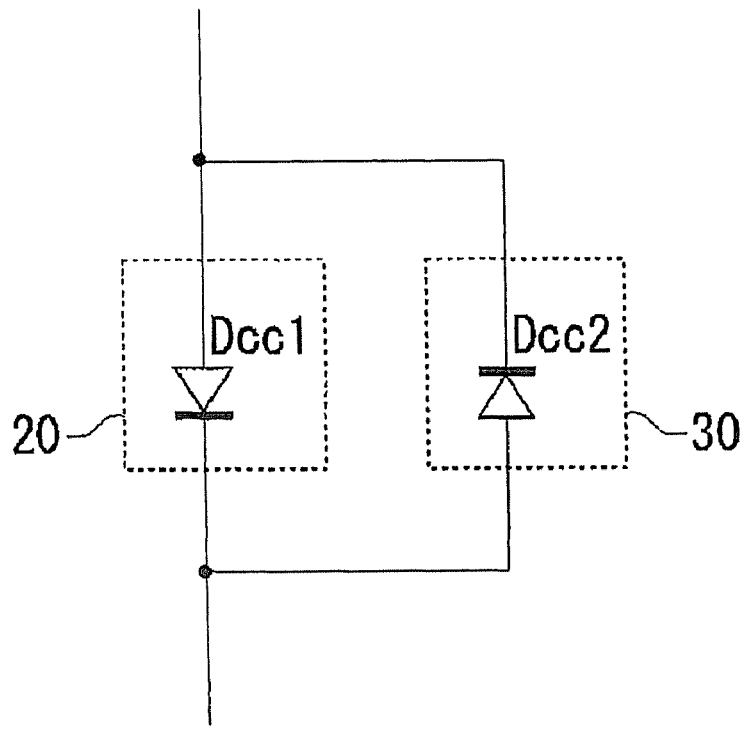
FIG. 2 is a circuit diagram showing a configuration example of a first current limiting circuit and a second current limiting circuit according to the first embodiment.

In the present embodiment, the first current limiting circuit 20 and the second current limiting circuit 30 are clamp circuits that respectively clamp the first drive current Idrv1 and the second drive current Idrv2 at a predetermined current value. FIG. 2 is a circuit diagram showing a configuration example of the first current limiting circuit 20 and the second current limiting circuit 30 according to the present embodiment. The first current limiting circuit 20 and the second current limiting circuit 30 include a first constant current diode Dcc1 and a second constant current diode Dcc2 arranged on a path of a current that is to be clamped. According to the configuration of FIG. 2, the first drive current Idrv1 and the second drive current Idrv2 are stabilized to a stipulated constant current by the first constant current diode Dcc1 and the second constant current diode Dcc2, respectively.

Figure 3:
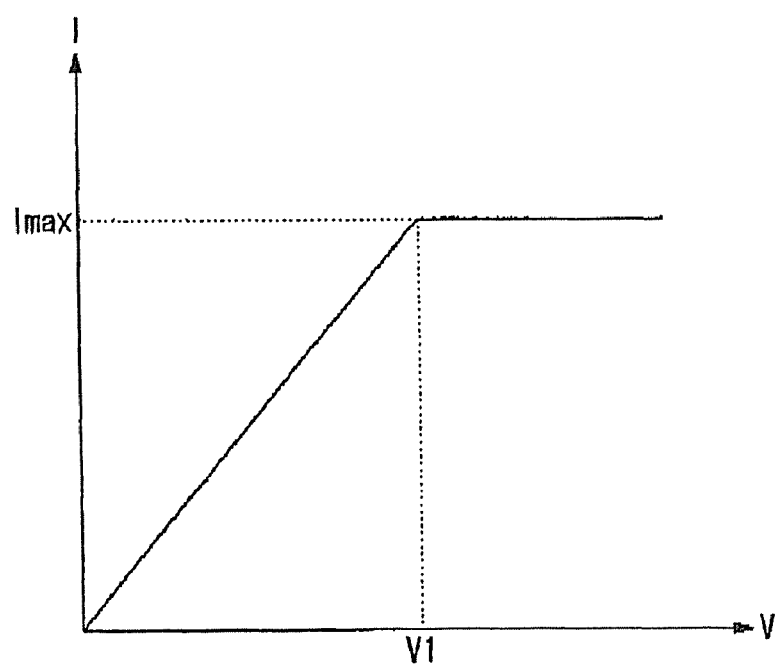
FIG. 3 is a chart showing a current-voltage characteristic of a light emitting element group when the first current limiting circuit and the second current limiting circuit of FIG. 2 are connected in series with the light emitting element group.

FIG. 3 is a diagram showing a current-voltage characteristic of the light emitting element group when the first current limiting circuit 20 and the second current limiting circuit 30 of FIG. 2 are connected in series with the light emitting element group 10. In FIG. 3, a horizontal axis indicates voltage and a vertical axis indicates current. As shown in FIG. 3, as voltage V applied to the light emitting device 100 increases, current flowing in the light emitting element group 10 increases, and is clamped at a predetermined current Imax when the voltage V reaches at a voltage V1 of about a few volts. The predetermined current Imax is set lower than a rated current of the first light emitting element Da and the second light emitting element Db.

Figure 4:
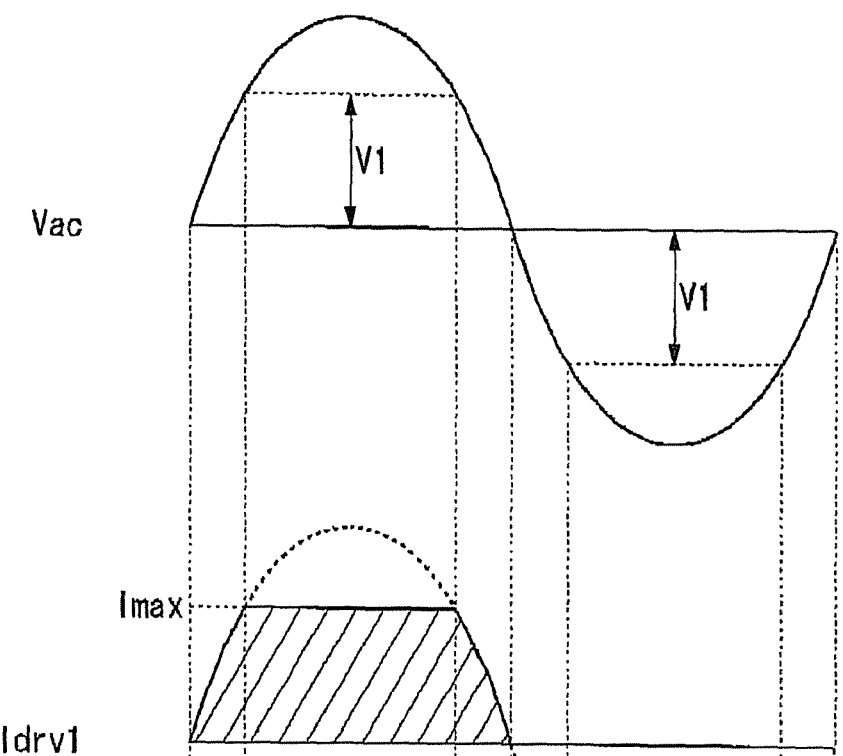
FIGS. 4A to 4C are operation waveform charts of the light emitting device of FIG. 1.

An explanation will be given concerning operation of the light emitting device 100 according to the present embodiment configured as above. FIGS. 4A to 4C are operation waveform charts of the light emitting device 100 of FIG. 1. FIG. 4A shows an AC voltage Vac, FIG. 4B shows the first drive current Idrv1, and FIG. 4C shows the second drive current Idrv2, through one cycle of an AC.

In a half-wave in which the AC voltage Vac is positive, the first drive current Idrv1 flows in a path formed by the first light emitting element Da inside the light emitting element group 10 and the first current limiting circuit 20. In a time-period in which the AC voltage Vac is lower than the voltage V1, the first drive current Idrv1 also rises in accordance with a current-voltage characteristic shown in FIG. 3. When the AC voltage Vac reaches the voltage V1 at time t1, the first drive current Idrv1 is clamped at the predetermined current Imax. When the AC voltage Vac goes below the voltage V1 at time t2, the first drive current Idrv1 decreases in accordance with the current-voltage characteristic shown in FIG. 3. At time t3 when the AC voltage Vac becomes negative, the first drive current Idrv1 becomes 0.

Conversely, in a half-wave in which the AC voltage Vac is negative, the second drive current Idrv2 flows in a path formed by the second light emitting element Db inside the light emitting element group 10, and the second current limiting circuit 30. The second drive current Idrv2 has an effect similar to that explained concerning the first drive current Idrv1 as described above, so that amplitude thereof is clamped at the predetermined current Imax.

According to the light emitting device 100 according to the present embodiment, since the first drive current Idrv1 and the second drive current Idrv2, which flow alternately according to phase of an AC voltage, in the light emitting element group 10, are clamped at the predetermined current value Imax, it is possible to prevent a current exceeding the rating from flowing in the light emitting elements.

Furthermore, in cases in which amplitude of the AC voltage Vac varies, since the first drive current Idrv1 and the second drive current Idrv2 are clamped at the predetermined current value determined by a constant current diode, it is possible to prevent brightness of the light emitting elements from varying, and it is possible for light to be emitted stably.

Furthermore, as shown in FIGS. 4B and 4C, the first drive current Idrv1 and the second drive current Idrv2 flow for each half-wave of the AC voltage Vac. That is, current flows only in a time-period of ½ cycle of the AC voltage in each of the first light emitting element Da and the second light emitting element Db. If in cases in which the light emitting element group 10 does not have a structure shown in FIG. 1, and a one-directional light emitting element only (that is, only one of either the first light emitting element Da or the second light emitting element Db) is provided, and furthermore, half-wave rectification of the AC voltage Vac is performed to drive this light emitting element, since the drive current flows during all of one cycle of the AC voltage, driving time of the light emitting element becomes longer in comparison to the present embodiment. Therefore, according to the light emitting device 100 according to the present embodiment, since it is possible to shorten effective light emission time of one light emitting element, it is possible to improve long-term reliability.

Second Embodiment

In the light emitting device 100 according to a second embodiment, functions of the first current limiting circuit 20 and the second current limiting circuit 30 are different, in comparison to the first embodiment. Below, an explanation is given concerning the light emitting device 100 according to the present embodiment, centered on differences from the first embodiment.

The first current limiting circuit 20 and the second current limiting circuit 30 according to the present embodiment are configured as current block circuits that interrupt paths when the first drive current Idrv1 and the second drive current Idrv2 respectively exceed a predetermined threshold current Imax.

Figure 5:
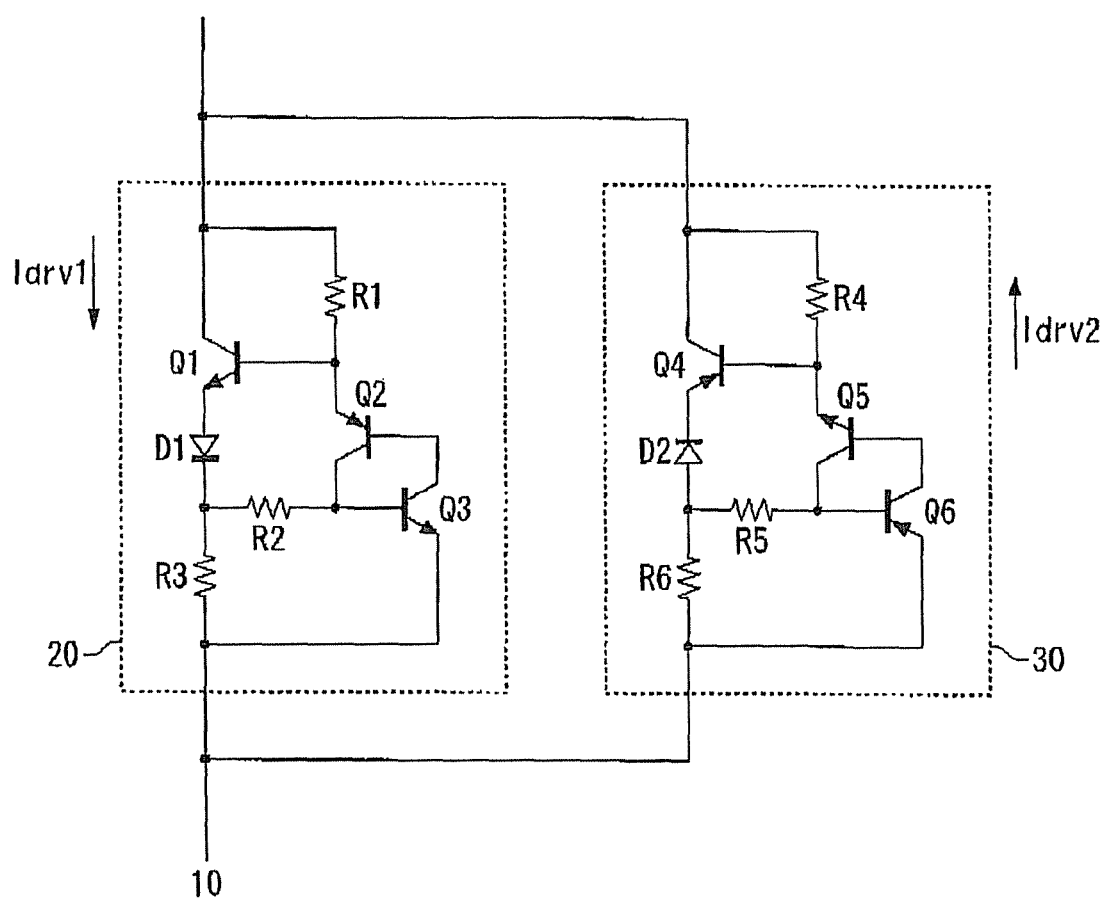
FIG. 5 is a circuit diagram showing a configuration example of the first current limiting circuit and the second current limiting circuit according to a second embodiment.

FIG. 5 is a circuit diagram showing a configuration example of the first current limiting circuit 20 and the second current limiting circuit 30 according to the present embodiment.

The current limiting circuit 20, which is a current block circuit includes a first bipolar transistor Q1 to a third bipolar transistor Q3, a first resistor R1 to a third resistor R3, and a first diode D1. The first bipolar transistor Q1 is of an NPN type. The first resistor R1 is arranged between base and collector of the first bipolar transistor Q1. The second bipolar transistor Q2 is of a PNP type, an emitter thereof being connected to the base of the first bipolar transistor Q1. The third bipolar transistor Q3 is of an NPN type, a collector thereof being connected to a base of the second bipolar transistor Q2, and a base thereof being connected to a collector of the second bipolar transistor Q2. An anode of the first diode D1 is connected to an emitter of the first bipolar transistor Q1. One end of the second resistor R2 is connected to a cathode of the diode D1, and the other end is connected to the base of the third bipolar transistor Q3. One end of the third resistor R3 is connected to a cathode of the first diode D1, and the other end is connected to an emitter of the third bipolar transistor Q3. The first current limiting circuit 20 has a collector terminal of the first bipolar transistor Q1 as an input terminal, and has the emitter of the third bipolar transistor Q3 as an output terminal.

The second current limiting circuit 30 is configured such that the NPN-type bipolar transistors of the first current limiting circuit 20 are reversed to PNP-type, and the anode and cathode of the diode are reversed. That is, the fourth bipolar transistor Q4 corresponding to the first bipolar transistor Q1 is of a PNP type. The fourth resistor R4 is arranged between base and collector of the fourth bipolar transistor Q4. The fifth bipolar transistor Q5 is of an NPN type, an emitter thereof being connected to the base of the fourth bipolar transistor Q4. The sixth bipolar transistor Q6 is of a PNP type, a collector thereof being connected to a base of the fifth bipolar transistor Q5, and a base thereof being connected to a collector of the fifth bipolar transistor Q5. A cathode of the second diode D2 is connected to an emitter of the fourth bipolar transistor Q4. One end of the fifth resistor R5 is connected to an anode of the second diode D2, and the other end is connected to the base of the sixth bipolar transistor Q6. One end of the sixth resistor R6 is connected to an anode of the second diode D2, and the other end is connected to an emitter of the sixth bipolar transistor Q6. The second current limiting circuit 30 has the emitter of the sixth bipolar transistor Q6 as an input terminal, and has a collector terminal of the fourth bipolar transistor Q4 as an output terminal.

The second current limiting circuit 30 may be used simply in an opposite direction to the first current limiting circuit 20. Conversely, the first current limiting circuit 20 may be disposed simply in an opposite direction to the second current limiting circuit 30.

Figure 6:
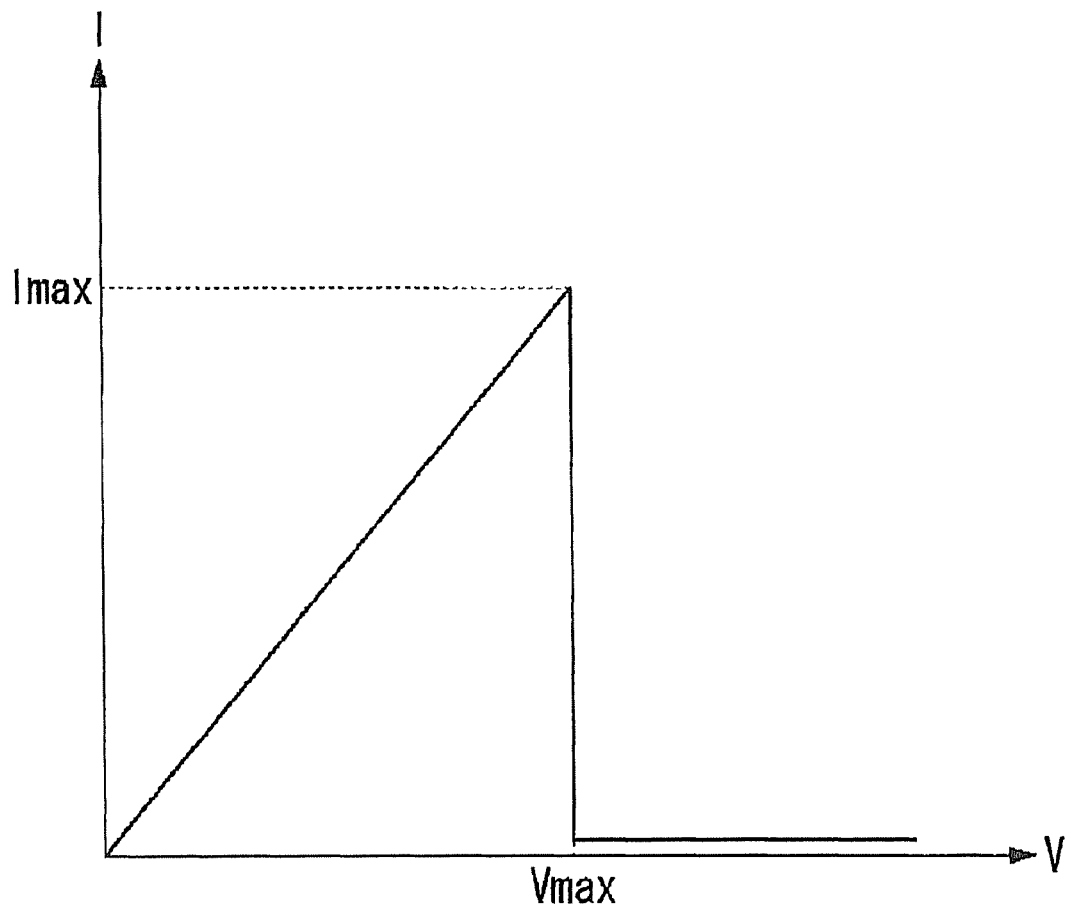
FIG. 6 is a chart showing a current-voltage characteristic of a light emitting element group when the first current limiting circuit and the second current limiting circuit of FIG. 5 are connected in series with the light emitting element group.

FIG. 6 is a diagram showing a current-voltage characteristic of the light emitting element group when the first current limiting circuit 20 and the second current limiting circuit 30 of FIG. 5 are connected in series with the light emitting element group 10. In FIG. 6, a horizontal axis indicates voltage and a vertical axis indicates current. As shown in FIG. 6, as voltage V applied to the light emitting device 100 increases, current flowing in the light emitting element group 10 increases, and when the current reaches a predetermined threshold current Imax, current path is interrupted, and the current decreases to a vicinity of 0 A. The predetermined current Imax is set lower than the rated current of the first light emitting element Da and the second light emitting element Db.

An explanation will be given concerning operation of the light emitting device 100 according to the present embodiment configured as above.

FIGS. 7A to 7C are operation waveform charts of the light emitting device 100 according to the second embodiment. FIG. 7A shows an AC voltage Vac, FIG. 7B shows the first drive current Idrv1 and FIG. 7C shows the second drive current Idrv2, through one cycle of an AC.

In a half-wave in which the AC voltage Vac is positive, the first drive current Idrv1 flows in a path formed by the first light emitting element Da inside the light emitting element group 10 and the first current limiting circuit 20. In a time-period in which the AC voltage Vac is lower than a voltage Vmax, the first drive current Idrv1 also rises in accordance with the current-voltage characteristic shown in FIG. 6. When the AC voltage Vac reaches the voltage Vmax at time t1, the first drive current Idrv1 is interrupted and decreases to a vicinity of 0 A. When the AC voltage Vac goes below the voltage Vmax at time t2, the first drive current Idrv1 begins to flow again, and decreases in accordance with the current-voltage characteristic shown in FIG. 6. At time t3 when the AC voltage Vac becomes negative, the first drive current Idrv1 becomes 0.

Conversely, in a half-wave in which the AC voltage Vac is negative, the second drive current Idrv2 flows in a path formed by the second light emitting element Db inside the light emitting element group 10 and the second current limiting circuit 30. The second drive current Idrv2 has a waveform as shown in FIG. 7C, by an effect similar to that explained concerning the first drive current Idrv1 as described above.

According to the light emitting device 100 according to the present embodiment, since the first drive current Idrv1 and the second drive current Idrv2, which flow alternately according to phase of an AC voltage, in the light emitting element group 10, decrease to the vicinity of 0 A when the AC voltage exceeds a predetermined voltage, it is possible to preferably prevent a current exceeding the rating from flowing in the light emitting elements.

Furthermore, in cases in which the amplitude of the AC voltage Vac varies, since the light emitting elements only emit light in an area in which the amplitude of the AC voltage is lower than the voltage Vmax, it is possible to prevent variation in brightness of the light emitting elements, and it is possible to cause light to be emitted stably.

Furthermore, in the present embodiment, similarly to the first embodiment, since light emission time of one light emitting element is limited to ½ period of the AC voltage or less, it is possible to improve long-term reliability of the light emitting device.

This embodiment is an example; various modified examples of combinations of various component elements and various processes thereof are possible, and a person skilled in the art will understand that such modified examples are within the scope of the present invention.

The light emitting device 100 may be configured to be entirely integrated as a unit, or a portion thereof may be configured as a discrete part or a chip part. For example, a configuration may have the first current limiting circuit 20 and the second current limiting circuit 30 integrated as a unit, and the light emitting element group 10 integrated on another chip. Decisions as to which parts are integrated to what extent may be made according to specification of the light emitting device 100, cost, or occupied area.

Furthermore, in the embodiments, an explanation was given concerning cases in which the light emitting element group 10 is provided only for one of the first current limiting circuit 20 and the second current limiting circuit 30 that are connected in parallel, but two light emitting element groups 10 may also be provided for both ends thereof. Moreover, a plurality of light emitting element groups 10 may be connected in parallel.

Furthermore, the clamp circuits used for the first current limiting circuit 20 and the second current limiting circuit 30 in the first embodiment, or the current block circuit used in the second embodiment may be substituted with circuits of other configurations having similar functions.

While the preferred embodiments of the present invention have been described using specific terms, such description is for illustrative purposes only, and it is to be understood that changes and variations may be made without departing from the spirit or scope of the appended claims.

The invention claimed is:

1. A light emitting device driven by an AC voltage, the device comprising:
    a light emitting element group including a plurality of light emitting element units connected in series;
    a first current limiting circuit arranged in series with the light emitting element group, to limit a first drive current flowing from one end to another end of the light emitting element group; and
    a second current limiting circuit arranged in parallel to the first current limiting circuit, to limit a second drive current flowing in a direction opposite to the first drive current in the light emitting element group; wherein
    the light emitting element units are configured to include a first light emitting element and a second light emitting element, an anode of the first light emitting element being connected to a cathode of the second light emitting element, and an anode of the second light emitting element being connected to a cathode of the first light emitting element.

2. A light emitting device according to claim 1, wherein the first and the second current limiting circuits are clamp circuits which respectively clamp the first drive current and the second drive current at a predetermined current value.

3. A light emitting device according to claim 2, wherein the clamp circuits include a constant current diode provided on a current path to be clamped.

4. A light emitting device according to claim 1, wherein the first and the second current limiting circuits are current block circuits which interrupt a path, when the first drive current and the second drive current respectively exceed a predetermined threshold current.

5. A light emitting device according to claim 4, wherein a current block circuit that is the first current limiting circuit comprises:
    an NPN-type first bipolar transistor;
    a first resistor arranged between base and collector of the first bipolar transistor;
    a PNP-type second bipolar transistor whose emitter is connected to the base of the first bipolar transistor;
    an NPN-type third bipolar transistor whose collector is connected to a base of the second bipolar transistor and whose base is connected to a collector of the second bipolar transistor;
    a first diode whose anode is connected to an emitter of the first bipolar transistor;
    a second resistor, one end of which is connected to a cathode of the first diode, and the other end of which is connected to the base of the third bipolar transistor; and
    a third resistor, one end of which is connected to the cathode of the first diode, and the other end of which is connected to an emitter of the third bipolar transistor; and wherein a collector terminal of the first bipolar transistor is an input terminal of the current block circuit, and the emitter of the third bipolar transistor is an output terminal of the current block circuit.

6. A light emitting device according to claim 4, wherein a current block circuit that is the second current limiting circuit comprises:
- a PNP-type fourth bipolar transistor;
- a fourth resistor arranged between base and collector of the fourth bipolar transistor;
- an NPN-type fifth bipolar transistor whose emitter is connected to the base of the fourth bipolar transistor;
- a PNP-type sixth bipolar transistor whose collector is connected to a base of the fifth bipolar transistor and whose base is connected to a collector of the fifth bipolar transistor;
- a second diode whose cathode is connected to an emitter of the fourth bipolar transistor;
- a fifth resistor, one end of which is connected to an anode of the second diode, and the other end of which is connected to the base of the sixth bipolar transistor; and
- a sixth resistor, one end of which is connected to the anode of the second diode, and the other end of which is connected to an emitter of the sixth bipolar transistor; and wherein the emitter of the sixth bipolar transistor is an input terminal of the current block circuit, and a collector terminal of the fourth bipolar transistor is an output terminal of the current block circuit.

7. A light emitting device according to claim 1, wherein the light emitting device is monolithically integrated on one semiconductor substrate.

* * * * *